(12) United States Patent
Whitlock

(10) Patent No.: US 9,579,592 B2
(45) Date of Patent: Feb. 28, 2017

(54) FILTER ELEMENTS

(71) Applicant: Pall Corporation, Port Washington, NY (US)

(72) Inventor: Michael Whitlock, Cortland, NY (US)

(73) Assignee: Pall Corporation, Port Washington, NY (US)

( * ) Notice: Subject to any disclaimer, the term of this patent is extended or adjusted under 35 U.S.C. 154(b) by 119 days.

(21) Appl. No.: 14/679,543

(22) Filed: Apr. 6, 2015

(65) Prior Publication Data
US 2016/0288025 A1 Oct. 6, 2016

(51) Int. Cl.
| B01D 29/00 | (2006.01) |
| B01D 29/07 | (2006.01) |
| B01D 29/11 | (2006.01) |
| B01D 29/21 | (2006.01) |
| B01D 29/23 | (2006.01) |
| B01D 29/58 | (2006.01) |

(52) U.S. Cl.
CPC ............ *B01D 29/07* (2013.01); *B01D 29/111* (2013.01); *B01D 29/21* (2013.01); *B01D 29/232* (2013.01); *B01D 29/58* (2013.01)

(58) Field of Classification Search
CPC ..... B01D 29/07; B01D 29/038; B01D 29/031; B01D 29/016; B01D 29/0022; B01D 29/0025; B01D 2201/12; B01D 39/08; B01D 39/16; B01D 63/067; B01D 63/14; B01D 29/333; B01D 29/353; B01D 29/21; B01D 29/232; B01D 29/56; B01D 29/58
USPC .......................... 210/483, 487, 493.1, 493.5, 493.2, 210/497.01, 498, 500.25, 500.27
See application file for complete search history.

(56) References Cited

U.S. PATENT DOCUMENTS

| 2,395,449 | A | | 2/1946 | Briggs |
| 4,235,722 | A | | 11/1980 | Sakaguchi |
| 5,084,178 | A | * | 1/1992 | Miller .................. B01D 29/012 156/474 |
| 5,252,207 | A | | 10/1993 | Miller et al. |
| 5,543,047 | A | | 8/1996 | Stoyell et al. |
| 5,552,048 | A | | 9/1996 | Miller et al. |

(Continued)

FOREIGN PATENT DOCUMENTS

| CN | 202460486 U | 10/2012 |
| EP | 0 913 183 A1 | 5/1999 |

(Continued)

OTHER PUBLICATIONS

European Patent Office, Extended European Search Report in counterpart European Application No. 16152963.1, mailed Aug. 5, 2016.

(Continued)

*Primary Examiner* — Nam Nguyen
*Assistant Examiner* — Julia Wun
(74) *Attorney, Agent, or Firm* — Leydig, Voit & Mayer

(57) ABSTRACT

A filter element has a pleated composite and first and second end elements mounted to opposite first and second ends of the filter element. The pleated composite has a filter medium layer and a grooved mesh drainage layer pleated with the filter medium layer. The grooved mesh drainage layer has a plurality of strands and a plurality of grooves formed in the strands. The grooved mesh drainage layer directs fluid via the grooves to or from the filter medium layer and the filter medium layer removes one or more substances from fluid flowing through the filter medium layer.

13 Claims, 4 Drawing Sheets

(56) References Cited

U.S. PATENT DOCUMENTS

| | | | |
|---|---|---|---|
| 6,0455,97 A | 4/2000 | Choi | |
| 6,113,784 A * | 9/2000 | Stoyell | B01D 29/111 210/493.2 |
| 6,932,850 B1 * | 8/2005 | Welch | B01D 29/012 264/286 |
| 7,625,418 B1 * | 12/2009 | Choi | B01D 29/012 156/204 |
| 8,251,231 B2 * | 8/2012 | Schindelin | B01D 46/0036 210/488 |
| 2004/0226877 A1 | 11/2004 | Karode et al. | |
| 2005/0173341 A1 | 8/2005 | Salinaro | |

FOREIGN PATENT DOCUMENTS

| | | |
|---|---|---|
| GB | 2 314 280 A | 12/1997 |
| WO | WO 02/22230 A2 | 3/2002 |
| WO | WO 2008/039377 A1 | 4/2008 |

OTHER PUBLICATIONS

Intellectual Property Office of Singapore, Search Report in counterpart Singapore Application No. 10201600195V, mailed Aug. 22, 2016.

\* cited by examiner

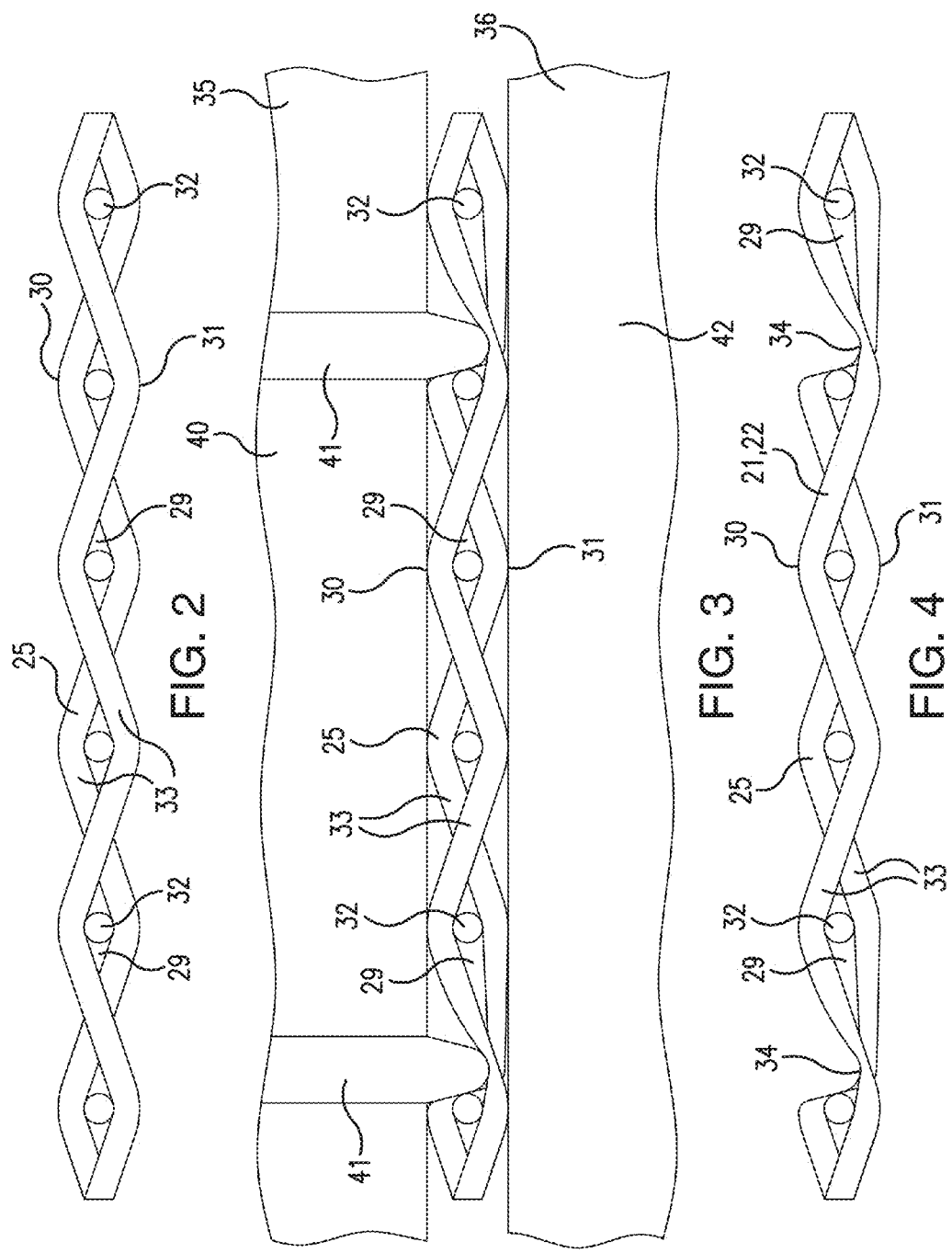

FILTER ELEMENTS

DISCLOSURE OF THE INVENTION

The present invention relates to filter elements for filtering fluids. Filter elements embodying the invention may include a pleated composite having a plurality of pleats which extend generally parallel to one another. The pleated composite includes at least one filter medium layer which removes one or more substances from a fluid flowing through the pleated composite. Filter elements embodying the invention may be used to filter any of numerous fluids and remove any of a wide variety of contaminants. For example, for some embodiments, the filter element may be used to filter a viscous fluid, such as a molten polymer, e.g., a molten thermoplastic. Molten polymers often include solids and/or gel-like contaminants that must be removed before the molten polymer may be further processed. Filter elements embodying the invention are particularly effective for removing contaminants from molten polymers.

In accordance with one aspect of the invention, filter elements embodying the invention may comprise a pleated composite and at least first and second end elements. The pleated composite has at least first and second opposite ends. The first and second end elements are mounted to the first and second ends of the pleated composite and serve to direct fluid through the pleated composite.

Additionally, the pleated composite has a plurality of pleats extending between the first and second opposite ends. Each pleat has an open end, a folded end, and a pair of pleat legs that extend between the open end and the folded end of the pleat.

Further, the pleated composite includes a filter medium layer and at least one grooved mesh drainage layer. The filter medium layer has first and second opposite sides, and the grooved mesh drainage layer is pleated with the filter medium layer along one of the first and second sides of the filter medium layer. For some embodiments, the pleated composite may include first and second grooved mesh drainage layers pleated with the filter medium layer, one extending along the first side of the filter medium layer and the other extending along the second side of the filter medium layer.

The grooved mesh drainage layer may have a plurality of strands and a plurality of grooves which are formed in the strands and which extend along one or both of the legs of the pleats. The grooved mesh drainage layer directs fluid to or from the first or second side of the filter medium layer, and the filter medium layer removes one or more substances from fluid flowing through the filter medium layer between the first and second sides of the filter medium layer.

Filter elements embodying the invention have many advantageous features and provide superior performance. For example, by providing a grooved mesh drainage layer along one or both sides of the filter medium layer, fluid is much more evenly and uniformly drained to and/or from the filter medium layer, even deep within the pleats. Consequently, all of the filter medium layer is effectively and efficiently used for filtration and the dirt capacity and service life of the filter elements are significantly enhanced.

BRIEF DESCRIPTION OF THE DRAWINGS

FIG. 2 is an end view of one example of a mesh.

FIG. 3 is an end view of a grooved mesh drainage layer formed between opposed rollers.

FIG. 4 is an end view of a grooved mesh drainage layer of the filter element of FIG. 1.

DISCLOSURE OF EMBODIMENTS

Figure 1:
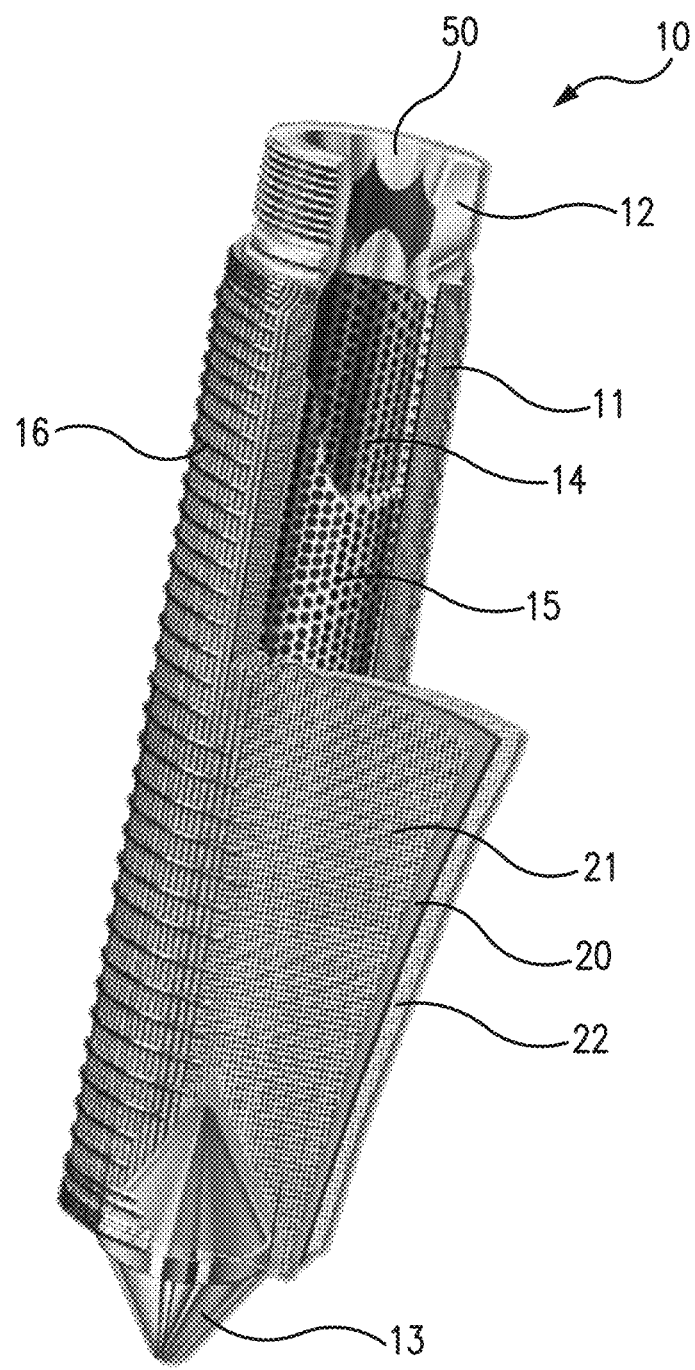
FIG. 1 is a cut-away perspective view of one example of a filter element embodying the invention.

Filter elements embodying the invention may be constructed in any of a wide variety of ways. One example of the many different embodiments of a filter element is shown in FIG. 1. Generally, the filter element 10 may include a pleated composite 11 having at least first and second opposite ends and at least first and second end elements 12, 13 mounted to the first and second ends, respectively, of the pleated composite 11. For many embodiments, the pleated composite 11 may have a hollow cylindrical configuration including a central axis A, opposite axial ends, a hollow interior 14, and a polygonal or oval cross section or, as shown in FIG. 1, a circular cross section. The first and second end elements 12, 13, for example, first and second end caps, may be mounted to the opposite axial ends of the pleated composite 11 to direct a fluid outside-in or inside-out through the hollow cylindrical filter element 10. The hollow cylindrical filter element may further include one or both of a perforated core 15 along the inner periphery of the pleated composite 11 and a retainer 16 along the outer periphery of the pleated composite 11. For other embodiments, the filter element may be very different. For example, the filter element may have a generally rectangular configuration. The pleated composite may include front and back sides and a pair of first and second opposite ends. End elements, for example, frame members, may be mounted to each of the four ends of the rectangular pleated composite and joined to one another to form a panel filter, the end elements directing a fluid through the pleated composite between the front and back sides.

The pleated composite may include at least two layers, i.e., a filter medium layer for removing one or more substances from a fluid flowing through the filter medium layer and at least one grooved mesh drainage layer for draining fluid to or from the filter medium layer. For example, the filter element 10 of FIG. 1 may be arranged in a housing (not shown) for outside-in flow and the pleated composite 11 may include a filter medium layer 20, a first grooved mesh drainage layer 21, and a second grooved mesh drainage layer 22. The filter medium layer 20 may have an upstream side 23 and an opposite downstream side 24. The first grooved mesh drainage layer 22 may be positioned along the upstream side 23 of the filter medium layer 21, and the second grooved mesh drainage layer 23 may be positioned along the downstream side 24 of the filter medium layer 21. For cylindrical embodiments, the upstream side of the filter medium layer may be the inner side or, as shown in FIG. 1, the outer side, depending on the intended direction of fluid flow inside-out or outside-in through the filter element. Similarly, the downstream side of the filter medium layer may be the outer side or, as shown in FIG. 1, the inner side. For rectangular embodiments, the upstream side of the filter medium layer may be the front side, while the downstream side may be the back side.

The filter medium layer may be configured in a great variety of ways depending, for example, on the nature of the fluid to be filtered and the filtering conditions, including the temperature at which the fluid is to be filtered. For example, the filter medium layer may be configured as only one layer or as multiple sublayers, each sublayer having the same or different filtering characteristics. The filter medium layer may be fashioned from one or more sheets of a filter medium comprising any of a variety of materials, including, for example, metallic, polymeric, and/or ceramic or glass materials. The filter medium may be formed, for example, as a sheet of sintered or unsintered fiber metal or powder metal or as a fine metal mesh; as a sheet of bonded or unbonded polymeric or ceramic or glass fibers; as a supported or unsupported polymeric membrane; or as a fine polymeric mesh. The filter medium may be permeable, including porous, permeable, semipermeable, or permselective, and the pore structure of the filter medium layer may be uniform or graded. The filter medium layer may have any of a variety of removal ratings, e.g., a removal rating in the micron range or coarser or in the submicron range or finer. For example, for some embodiments, the filter medium layer may comprise a single layer of sintered porous fiber metal available from Pall Corporation under the trade design DYNALLOY and having a removal rating of about 20 microns.

Like the filter medium layer, the grooved mesh drainage layer may also be configured in a great variety of ways. The grooved mesh drainage layer may be configured as only one layer or as two or more mesh sublayers and may be fashioned from a metallic mesh having metallic strands or a polymeric mesh having polymeric strands. Any of numerous meshes may be used for the grooved mesh drainage layer, including, for example, woven meshes or nonwoven meshes. A woven mesh may have any of a variety of weaves, including, for example, a plain weave, a Dutch weave, or a twilled weave. A nonwoven mesh may be structured in any numerous of ways, including, for example, as an extruded mesh, an expanded mesh, or a slotted mesh. Any of the meshes may be symmetric or asymmetric. Generally, a mesh may comprise a plurality of strands which intersect one another to form mesh openings between them. The plurality of strands may include a plurality of first strands extending generally parallel to one another in a first direction and a plurality of second strands extending generally parallel to one another in a second direction. The first and second strands may intersect one another at a variety of angles, e.g., at 90°, greater than 90°, or less than 90°.

Any of a wide variety of sizes of the openings in the mesh may be selected depending, for example, on the nature of the fluid and the size of the substances, e.g., the contaminants, in the fluid to be removed by the filter medium layer. Generally, the size of the openings may be large enough to allow the fluid to readily flow through the grooved mesh drainage layer to or from most or all of the filter medium layer without producing a significant additional pressure drop through the pleated composite. Further, the size of the openings may be large enough to allow all or most of any contaminants in the fluid to pass through the grooved mesh drainage layer to the filter medium layer, where the filter medium layer may remove the contaminants.

One of many different examples of a mesh 25 that may be used for a grooved mesh drainage layer is shown in FIG. 2 in an edge view. The mesh 25 may include first and second opposite sides 30, 31, a plurality of first strands 32, for example, comprising the warp or machine direction strands, and a plurality of second strands 33, for example, comprising the weft strands. For some embodiments, the mesh may comprise a woven mesh of metal wire strands having a plain weave and a strand count and diameter of about 30×30×0.012×0.012 inch or coarser; between 30×30×0.012×0.012 inch and 60×60×0.0075×0.0075 inch, e.g., about 40×40×0.0055×0.0055 inch; or about 60×60×0.0075×0.0075 inch or finer.

Figure 5:
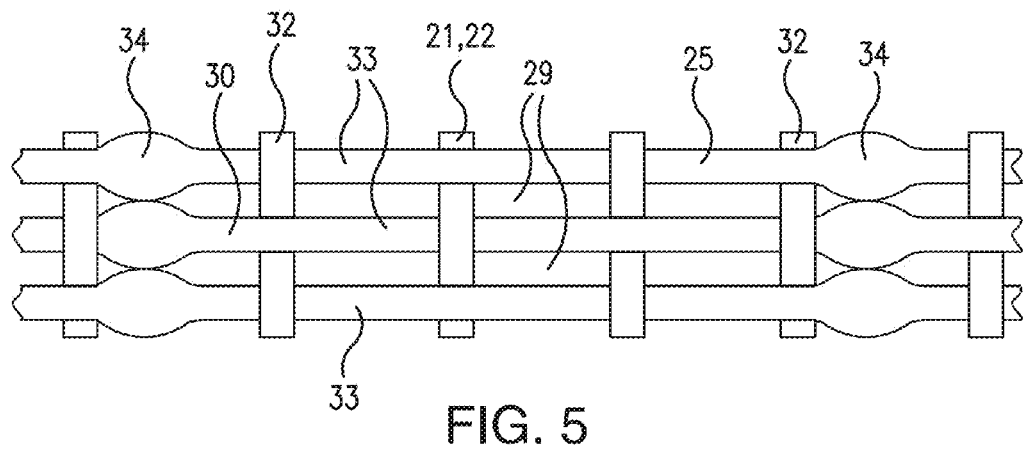
FIG. 5 is a plan view of the grooved mesh drainage layer of FIG. 4.

The grooves in the grooved mesh drainage layer may be formed in a myriad of ways. For example, the grooves may be formed in only one of the sides or in both sides of the mesh. Where the grooved mesh drainage layer has multiple sublayers, the grooves may be formed in each individual sublayer or in the sublayers collectively. The grooves may be formed parallel to the first strands of the mesh or nonparallel and intersecting the first strands. The grooves may be formed parallel to the second strands of the mesh or nonparallel and intersecting the second strands. All or a first group of the grooves may be formed parallel to one another and spaced from one another by a constant or varying pitch distance, or the grooves may formed to include first and second groups which intersect one another. For many embodiments, all of the grooves may extend parallel to one another in one direction only, for example, parallel to the warp or machine direction strands. Further, each of the grooves may be formed to extend continuously or discontinuously along the grooved mesh drainage layer. For some embodiments, the plurality of grooves 34 in the grooved mesh drainage layer 21, 22 may be continuous and may extend parallel to one another and parallel to the first strands 32 in only the first side 30 of the mesh 25, as shown in FIGS. 4 and 5.

For many embodiments, the grooves may be formed in the mesh of the grooved mesh drainage layer by passing the mesh between opposed rollers. The rollers may be variously configured depending, for example, on the desired configuration or pattern of the grooves in the mesh. For example, both of the rollers may include raised ribs which press grooves into the mesh, which results in grooves in both sides of the mesh. Alternatively, only one roller may include raised ribs, which results in grooves in only one side of the mesh. In the illustrated embodiment in FIG. 3, the body 40 of the upper roller 35 may include a plurality of raised ribs 41 which extend radially beyond the body 40, while the body 42 of the lower roller 36 may be generally smooth without any raised ribs. The ribs may be variously configured, depending, for example, on the desired configuration of the grooves. For example, in the illustrated embodiment, the ribs 41 may be spaced from one another by a constant pitch distance D and may extend continuously circumferentially around the body 40 of the upper roller 35. The mesh 25 may be fed through the rollers 35, 36 with the first side 30 of the mesh 25 facing the ribbed upper roller 35 and the second side 31 of the mesh 25 facing the lower roller 36. Further, the mesh 25 may be positioned between the rollers 35, 36 with each of the raised ribs 41 located between a pair of adjacent first strands 32. The pitch distance D may be arranged to span a plurality of first strands 32, e.g., two, three, four, or more of the first strands 32. As the mesh 25 passes between the rollers 35, 36, the grooves 34 are pressed into the mesh 25 by the raised ribs 41, and the bodies 40, 42 of the rollers 35, 36 may press against the first and second sides 30, 31, of the mesh 25. As the raised ribs 41 press the grooves 34 into the mesh 25, the strands within the grooves, for example, the second strands 33 near the bottom of the grooves 34 may be deformed, e.g., flattened and/or stretched. The remaining portions of the second strands 33, as well as the first strands 32, may undergo little or no deformation by the raised ribs 41, thereby maintaining the structural integrity of the grooved mesh drainage layer. In other embodiments, both the first and second strands may be deformed by the rollers. The smooth portion of the body 40 between the ribs 41 of the ribbed roller 35 may maintain the first side 30 of the grooved mesh drainage layer 21, 22 relatively flat between the grooves 34, while the smooth body 42 of the lower roller 36 may maintain the entire second side 31 of the grooved mesh drainage layer 21, 22 relatively flat as well. With the rollers 35, 36 configured as shown in FIG. 3, the resulting grooved mesh drainage layer 21, 22 may include a plurality of continuous parallel grooves 34 evenly spaced by the pitch distance D formed in only one side 30 of the mesh 25, and extending parallel to and between, without intersecting, adjacent first strands 32 of the mesh 25. Of course, differently configured rollers may result in differently configured grooves in the grooved mesh drainage layer.

The process, and the process conditions, for forming the grooved mesh drainage layer may vary depending, for example, on the nature of the mesh. For example, the pressure exerted on the mesh 25 by the rollers 35, 36 may be selected to permanently press the grooves 34 into the mesh 25, e.g., to permanently deform the strands, without breaking the strands or unduly occluding the mesh openings. For a polymeric mesh, heat as well as pressure may be applied to the mesh, for example, via the rollers, to permanently deform the strands without breaking or melting the strands or unduly occluding the mesh openings. Further, the mesh may be calendered and/or annealed one or more times before and/or after the mesh is passed through the rollers, for example, to make the grooved mesh drainage layer smoother and thinner and to further enhance the structural integrity and ductility of the grooved mesh drainage layer.

The pleated composite may include additional layers beyond the filter medium layer and the one or more grooved mesh drainage layers. For example, where the filter medium layer comprises a porous polymeric membrane, the composite may additionally include a support layer located in contact with the filter medium layer on one or both sides. The support layer may comprise a mesh or a fibrous sheet that has more mechanical strength than the more flimsy polymeric membrane and, thereby, provides additional mechanical support enabling the porous membrane to better withstand the pleating process. As another example, where the filter medium layer comprises a porous polymeric membrane or a fibrous polymeric or glass fiber sheet, the composite may additionally include a cushioning layer between the filter medium layer and grooved mesh drainage layer. The cushioning layer may be a strong, smooth polymeric fibrous sheet that prevents abrasion of the filter medium layer by the grooved mesh drainage layer during the pleating process and/or during filtration. Various examples of cushioning layers are disclosed, for example, in U.S. Pat. No. 5,252,207, which is incorporated by reference to further describe cushioning layers and other aspects of the filter.

Prior to pleating, the composite may be formed by overlaying the layers, e.g., overlaying the filter medium layer and the at least one grooved mesh drainage layer. For example, a composite may be formed by overlaying an upstream grooved mesh drainage layer along the upstream side of the filter medium layer and/or overlaying a downstream grooved mesh drainage layer along the downstream side of the filter medium layer. A grooved mesh drainage layer may be overlaid along the filter medium layer with the grooved mesh drainage layer contacting the filter medium layer or with one or more additional layers located between the grooved mesh drainage layer and the filter medium layer. Where the grooved mesh drainage layer has grooves formed in only a first side of the mesh, the grooved mesh drainage layer may be overlaid along the filter medium layer with the grooved first side facing away from the filter medium layer. The second side of the grooved mesh drainage layer may then be closer to the filter medium layer than the opposite grooved first side and, for some embodiments, may contact the filter medium layer. Further, for many embodiments, where the grooved mesh drainage layer has grooves formed in only a first side, the first side of the grooved mesh drainage layer may be the side of the composite that is situated most upstream or most downstream. In other words, for many embodiments where the grooved mesh drainage layer has grooves on only the first side of the mesh, no additional layers of the composite may be overlaid on the grooved first side of the grooved mesh drainage layer.

Figure 6:
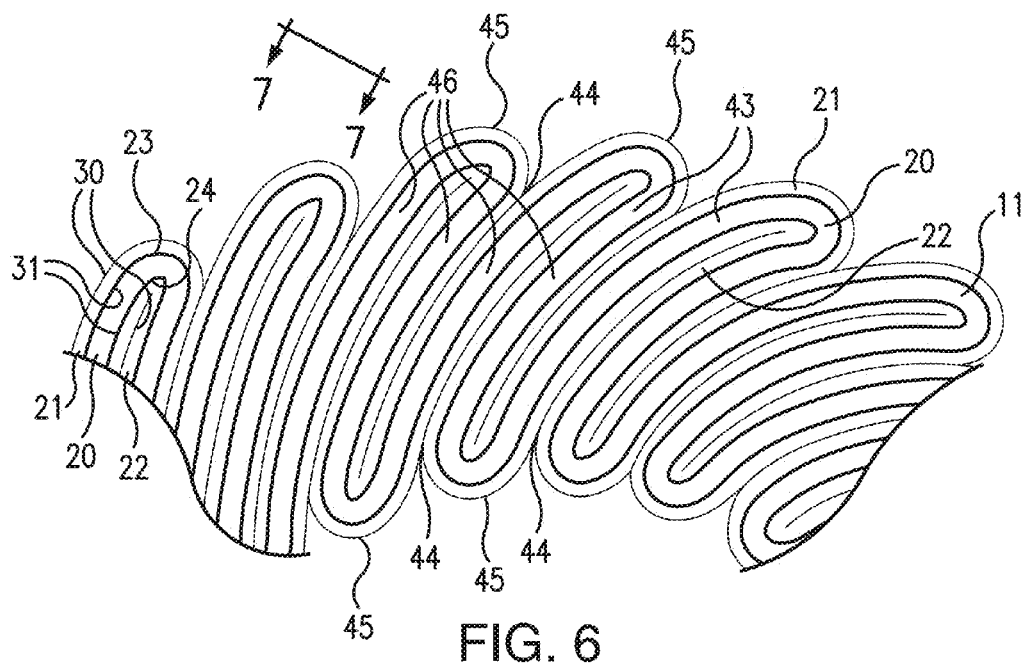
FIG. 6 is an axial view of the pleated composite of the filter element of FIG. 1 and also shows the sight line for FIG. 7.
Figure 7:
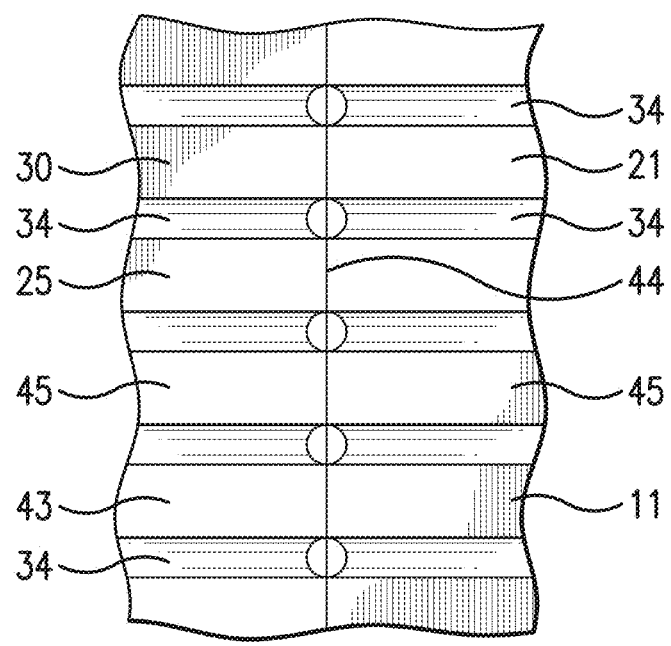
FIG. 7 is a view of a portion of the outer periphery of the pleated composite of FIG. 6.

The composite, including the filter medium layer and at least one grooved mesh drainage layer, may be pleated in any of numerous ways to form a plurality of pleats, where each pleat has an open end, a folded end, and a pair of pleat legs that extend between the open end and the folded end. For example, for some embodiments, the pleated composite may be formed as a hollow generally cylindrical structure with axially extending pleats where the height of the pleats is greater than the radial distance between the inner periphery and the outer periphery of the pleated composite. Examples of a hollow cylindrical filter element having a pleat height greater than the radial distance between the inner and outer peripheries are disclosed, for example, in U.S. Pat. No. 5,543,047, which is incorporated by reference to further describe pleats and other aspects of the filter. A pleated composite 11 embodying the present invention and having a similar configuration is shown in FIGS. 6 and 7. Each pleat 43 has an open end 44, a folded end 45 and a pair of pleat legs 46 extending between the open end 44 and the folded end 45. Further, the height of each pleat as measured along adjacent pleat legs is greater than the radial distance between the inner and outer peripheries of the pleated composite 11. For many of these embodiments, the pleat legs 46 may be in intimate contact with one another along substantially the entire height of the pleats 43. The pleated composite 11 may then include both an upstream grooved mesh drainage layer 21 and a downstream grooved mesh drainage layer 22 along the upstream and downstream sides 21, 22 of the filter medium layer 20 to facilitate drainage of the fluid to and from the filter medium layer 20. Where the grooved first side 30 of the grooved mesh drainage layer 21 is on the outer periphery of the pleated composite 11, the grooves 34 may extend, for example, continuously, along the outer periphery from the open ends 44 of the pleats 43 along the pleat legs 46 to the folded end 45 deep within the pleats 43. Similarly, where the grooved first side 30 of the grooved mesh drainage layer 21 is on the inner periphery of the pleated composite 11, the grooves 34 may extend, for example, continuously, along the inner periphery from the folded ends 45 deep within the pleats 43 along the pleat legs 46 to the open ends 44 of the pleats 43. Within the pleats, the grooves on adjacent pleat legs may either be aligned with one another or offset from one another.

As another example, for some embodiments, the pleated composite may be formed as a hollow generally cylindrical structure with axially extending pleats where the height of the pleats is no greater than the radial distance between the inner periphery and the outer periphery of the pleated composite. Examples of a hollow cylindrical filter element having a pleat height no greater than the radial distance between the inner and outer peripheries are disclosed, for example, in U.S. Pat. No. 5,252,207. For many of these embodiments, the pleated composite may include a grooved mesh drainage layer along at least the inner side of the filter medium layer to facilitate drainage of the fluid to or from the inner side of the filter medium layer.

As yet another example, the pleated composite may be formed into a generally rectangular configuration having longitudinally extending pleats, two pairs of opposite ends, and front and back sides, as previously described. The pleated composite may include a grooved mesh drainage layer along the front side or the back side or both.

End elements may be configured, and may be mounted to the ends of the pleated composite, in any of numerous ways. For example, where the pleated composite 11 has a hollow cylindrical configuration, the end elements 12, 13 may include first and second end caps mounted to the opposite axial ends of the pleated composite 11, as shown in FIG. 1. One, or both, of the end elements may be an open end element 12 which has an opening 50 that fluidly communicates between the interior 14 and the exterior of the hollow cylindrical pleated composite 11. One of the end elements may be a blind end element 13 that closes off the end of the pleated composite 11 and prevents fluid communication between the interior 14 and the exterior of the pleated composite. The end elements 12, 13 may direct a fluid radially outside-in or inside-out through the pleated composite 11. Where the pleated composite has a rectangular configuration, the end elements may include frame members mounted to each of the four ends of the pleated composite and to each other at the corners of the pleated composite between the front and back sides of the pleated composite.

The end elements may be fashioned from a variety of impermeable materials, including metallic and polymeric materials, and may have a great variety of shapes and sizes. For some embodiments, one or more of the end elements may be configured as a fitting to facilitate attaching the filter element to a housing. For example, as shown in FIG. 1, the open end element 12 may be configured as a threaded fitting. Further, the end elements may be mounted to the pleated composite in any of numerous ways. For example, the end elements may be welded or bonded to the ends of the pleated composite.

The core and the retainer may also be variously configured. For example, the core 15 may serve to support the pleated composite against the forces associated with outside-in fluid flow and may comprise a perforated metal or polymeric tube or cylinder located around the inner periphery of the pleated composite 11. The retainer may serve to protect the pleated composite during installation and to support the pleated composite against forces associated with inside-out flow. The retainer 16 may comprise a helical wire cage fitted around the outer periphery of the pleated composite 11, as shown in FIG. 1. Alternatively, the retainer may comprise a perforated metal or polymeric cylinder positioned around the outer periphery of the pleated composite, or one or more metal or polymeric wrap members wrapped, e.g., circumferentially or helically around the outer periphery of the pleated composite. One or both of the core and the retainer may be mounted to the end elements along with the pleated composite.

Filter elements embodying the invention have many advantageous features that provide superior performance. For example, a grooved mesh drainage layer has a significantly lower resistance to edgewise flow, i.e., flow within the grooved mesh drainage layer parallel to the opposite major surfaces of the grooved mesh drainage layer, which includes flow within the grooves.

In an experiment which shows the lower edgewise flow resistance of a grooved mesh drainage layer, fluid is directed edgewise through a baseline mesh and through the same type of mesh formed into a grooved mesh drainage layer. Each mesh is a plain, square weave 30×30×0.012×0.012 inch stainless steel woven wire mesh. For the grooved mesh drainage layer, grooves are formed in only one side of the mesh. The grooves are generally parallel to the warp or machine direction wires and are spaced by a constant pitch distance of about 0.133 inch (e.g., about every fourth warp wire). Both the baseline mesh and the grooved mesh drainage layer are similarly calendered and annealed.

Two layers of the baseline mesh are sandwiched between opposite layers of a Dynalloy 20 micron sintered fiber metal filter medium to form a first test composite. Similarly, two grooved mesh drainage layers are sandwiched between opposite layers of the same filter medium to form a second test composite, the grooved sides of the two grooved mesh drainage layers facing one another. The layers of both test composites are pressed against one another by a fluid at a pressure similar to an intended operating pressure of filter element.

The edgeflow of each test composite is then determined by sealing each test composite between two impervious plates and directing a fluid between the plates edgewise through the test composite. Because the edgeflow resistance of the filter media layers is so large, edgeflow occurs substantially within the mesh layers or the grooved mesh drainage layers, and the edgeflow resistance of each test composite is essentially the edgeflow resistance of the mesh layers or the grooved mesh drainage layers within the test composite. For the first test composite with the baseline mesh layers the edgeflow resistance coefficient ($K_e$) is about 0.00128 (psi*min)/(mL*cP). For the second test composite with the grooved mesh drainage layers, the edgeflow resistance coefficient (Ke) is about 0.00040 (psi*min)/(mL*cP). Thus, the edgeflow resistance of the grooved mesh drainage layers is about one third of the edgeflow resistance of the baseline mesh layers.

Consequently, by providing at least one grooved mesh drainage layer in the pleated composite of a filter element embodying the invention, fluid far more easily flows edgewise through the grooved mesh drainage layer into the pleats along the pleat legs from the open ends all the way to the folded ends or out of the pleats along the pleat legs from the folded ends to the open ends. Consequently, the grooved mesh drainage layer more readily drains fluid to or from the entire filter medium layer, even deep within the pleats, allowing all of the filter medium layer to be effectively and efficiently used for filtration. Further, the grooved mesh drainage layer drains fluid to or from the entire side of the filter medium layer evenly and uniformly within the pleats, resulting in a higher dirt capacity and/or a longer service life.

One of many examples of a flow pattern within a pleated composite may be described with respect to the pleated composite 11 shown in FIGS. 6 and 7. Fluid may flow generally radially outside-in through the pleated composite 11, unfiltered fluid entering the open ends 44 of the pleats 43 via the upstream grooved mesh drainage layer 21. The unfiltered fluid then flows edgewise through the upstream grooved mesh drainage layer 21 via the grooves 34 and any interconnected openings 29 along the pleat legs 46 all the way to the folded ends 45 deep within the pleats 43. From the upstream grooved mesh drainage layer 21, the unfiltered fluid enters and flows through the filter medium layer 20 from the upstream side 23 to the downstream side 24, where substances within the fluid are removed by the filter medium. Because the upstream grooved mesh drainage layer 21 drains fluid to all portions of the upstream side 23 of the filter medium layer 20, even deep within the pleats 43, the entire filter medium layer 20 is effectively and efficiently used for filtration. From the downstream side 24 of the filter medium layer 20, the filtered fluid, e.g., the filtrate or permeate, may flow generally radially edgewise through the downstream grooved mesh drainage layer 22 via the grooves 34 and any interconnected openings 29 along the pleat legs 46 from the folded ends 45 deep within the pleats 43 to the open ends 44, where the filtered fluid enters the interior 44 of the pleated composite 11 and exits the filter element 10 via the opening 50 in at least one open end cap 12. Because the downstream grooved mesh drainage layer 22 drains fluid from all portions of the downstream side 24 of the filter medium layer 20, even deep within the pleats 43, the entire filter medium layer 20 is effectively and efficiently used for filtration.

Of course, in other embodiments, the pleated composite may have only one grooved mesh drainage layer along the upstream side or along the downstream side of the filter medium layer and/or the fluid may flow generally radially inside-out or laterally from the front side to the backside. In all embodiments, the grooved mesh drainage layer enhances the performance of the filter element.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., open-ended terms including "such as," "for example", or "e.g.") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Thus, while various aspects of the invention have been described and/or illustrated with respect to several embodiments, the invention is not limited to these embodiments. For instance, one or more features of any embodiment may be eliminated or modified or one or more features of one embodiment may be combined with one or more features of other embodiments without departing from the scope of the invention. Any combination of the above-described elements in all possible variations thereof is encompassed by the invention unless otherwise indicated herein or otherwise clearly contradicted by context. Even embodiments with very different features may be within the scope of the invention. Accordingly, this invention includes all modifications and equivalents of the subject matter recited in the claims appended hereto as permitted by applicable law.

The invention claimed is:

1. A filter element for removing one or more substances from a fluid flowing through the filter element, the filter element comprising:
   a pleated composite having at least first and second opposite ends and a plurality of pleats extending between the first and second opposite ends, wherein each pleat has an open end, a folded end, and a pair of legs extending between the open end and the folded end, wherein the pleated composite includes a filter medium layer having first and second opposite sides and a grooved mesh drainage layer pleated with the filter medium layer along one of the first and second sides of the filter medium layer, the grooved mesh drainage layer having a plurality of strands having deformed portions and a plurality of grooves formed by the deformed portions in the strands, the plurality of grooves extending along one or both legs of each pleat, and wherein the grooved mesh drainage layer directs fluid via the grooves to or from said one of the first and second sides of the filter medium layer and the filter medium layer removes one or more substances from fluid flowing through the filter medium layer from the first side of the filter medium layer to the second side of the filter medium layer, and
   first and second end elements mounted to the first and second ends, respectively, of the pleated composite.

2. The filter element of claim 1 wherein the grooved mesh drainage layer contacts said one of the first and second sides of the filter medium layer.

3. The filter element of claim 1 wherein the grooved mesh drainage layer extends along the first side of the filter medium layer and drains fluid to the first side of the filter medium layer via the grooves.

4. The filter element of claim 1 wherein the grooved mesh drainage layer extends along the second side of the filter medium layer and drains fluid from the second side of the filter medium layer via the grooves.

5. The filter element of claim 1 wherein the grooved mesh drainage layer has first and second sides, the first side including the plurality of grooves, wherein the grooved mesh drainage layer and the filter medium layer are positioned in the pleated composite with the second side of the grooved mesh drainage layer closer to the filter medium layer than the first side of the grooved mesh drainage layer.

6. The filter element of claim 1 wherein the plurality of strands of the grooved mesh drainage layer comprise metallic strands.

7. The filter element of claim 1 wherein the plurality of strands of the grooved mesh drainage layer comprise polymeric strands.

8. The filter element of claim 1 wherein the plurality of grooves of the grooved mesh drainage layer extend parallel to one another.

9. The filter element of claim 8 wherein the plurality of strands includes a first plurality of parallel strands that extend parallel to the plurality of parallel grooves, each parallel groove being positioned between and parallel to a pair of first and second adjacent parallel strands.

10. The filter element of claim 1 wherein the plurality of grooves of the grooved mesh drainage layer extend continuously along said one or both legs of each pleat between the open end and the folded end.

11. The filter element of claim 1 wherein the pleated composite has a cylindrical configuration and a hollow interior and wherein at least one of the end elements has an opening fluidly communicating with the hollow interior.

12. The filter element of claim 11 further comprising a perforated core positioned within the hollow interior of the pleated composite.

13. The filter element of claim 11 wherein the height of each pleat is greater than the radial distance between the inner periphery and the outer periphery of the pleated composite.

\* \* \* \* \*